Nov. 10, 1925.

H. S. BERGEN

WEIGHING SCALE

Filed Feb. 25, 1920

1,561,048

Inventor
Harry S. Bergen
By George R. Frye
Attorney

Patented Nov. 10, 1925.

1,561,048

UNITED STATES PATENT OFFICE.

HARRY S. BERGEN, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed February 25, 1920. Serial No. 361,157.

*To all whom it may concern:*

Be it known that I, HARRY S. BERGEN, a citizen of the United States, residing at Toledo, in the county of Lucas and State of Ohio, have invented certain new and useful Improvements in Weighing Scales, of which the following is a specification.

This invention relates particularly to counter scales of the type having two pans such as are commonly used in drug stores, and one of the principal objects of the invention is to increase the sensitiveness and accuracy of the weighing mechanism.

Other objects and advantages will be apparent from the following description, in which reference is had to the accompanying drawings illustrating a preferred embodiment of my invention and in which similar reference numerals designate similar parts throughout the views.

Figure 2:
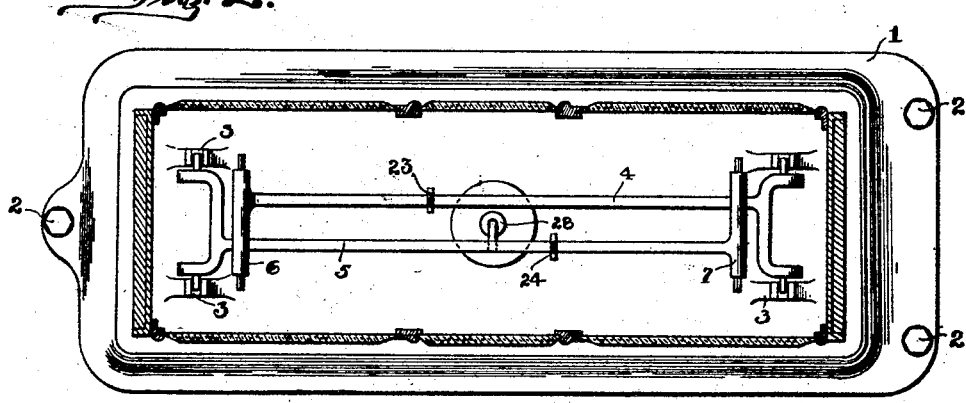
Figure 2 is a sectional plan view of the same taken substantially on the line 2—2 of Figure 1, and with parts omitted for the sake of clearness.

Referring to the drawings in detail, the base 1 of the scale is supported upon adjustable feet 2, preferably three in number, and carries near each of its ends a pair of fulcrum stands 3. Fulcrumed adjacent one end upon bearings in the fulcrum stands 3 are oppositely-extending levers 4 and 5, the fulcrum ends of which are bifurcated, as shown in Figure 2, for the purpose of obtaining lateral stability, and the free ends of which are provided with lateral extensions 6 and 7 carrying upturned knife edge load pivots to support the pan spiders 8 and 9. Counterpoise and commodity pans 10 and 11 are carried upon the spiders 8 and 9, which are provided respectively with downwardly-extending stems 10ª and 11ª, the lower ends of said stems being pivotally connected to check links 12 and 13. The check links 12 and 13 are pivoted respectively to short brackets 14 and 15 which are secured to the base 1 of the scale directly beneath the axes of the lever fulcrums. The pans 10 and 11 are thus maintained in horizontal position as they move upwardly and downwardly during weighing operations. The mechanism so far described, with the exception of the pans and spiders, is enclosed within a box-like housing 16 which is suitably secured to the base 1.

Figure 1:
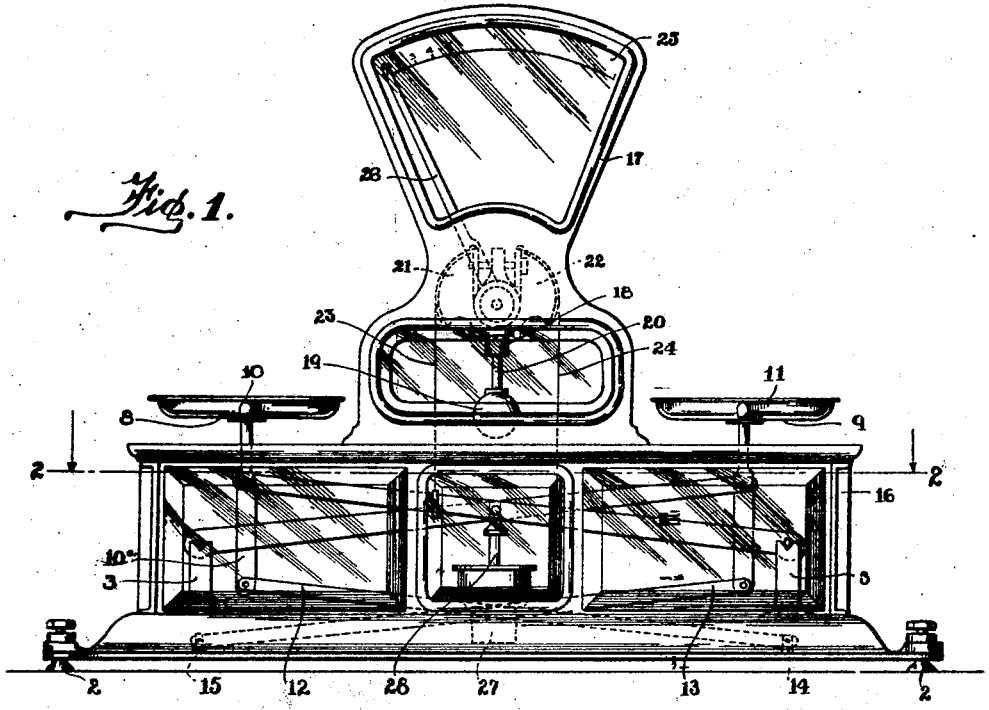
Figure 1 is a front elevation of a scale embodying my invention.

Secured upon the housing 16 is a substantially fan-shaped upright casing 17, and swingingly suspended within the casing 17 is a pendulum 18 comprising a heavy bob 19 and stem 20. Oppositely-extending power sectors 21 and 22 are rigidly secured to the pendulum 18 to swing therewith and these power sectors are connected respectively to the levers 4 and 5 by means of flexible steel bands or ribbons 23 and 24, as clearly shown in Figure 1. Thus, when the free end of the lever 5 is moved downwardly a pull will be exerted through the ribbon 24 upon the power sector 22, causing the pendulum 18 to swing to the left, thereby creating an upward pull upon the ribbon 23 and raising the free end of the lever 4.

The upper portion of the fan-shaped casing 17 is provided with a window which displays the graduated chart 25, and an index 26 is rigidly secured to the pendulum 18 and arranged to swing over the chart 25 when the pendulum swings to the left.

In order to prevent undue vibration of the weighing mechanism, the dash pot 27 adapted to contain a fluid such, for example, as hydro-carbon oil is centrally mounted upon the base 1, and a reciprocating dash pot plunger co-operating therewith is connected by means of the link 28 to the lever 5.

In operating the scale when the commodity to be weighed is placed in the pan 11 at the right side of the scale, the free end of the lever 5 is depressed, creating a downward pull on the ribbon 24 and swinging the pendulum 18 to the left. The index hand, being rigidly attached to the pendulum, is moved to the right until the weight of the commodity is indicated upon the chart 25. Should the weight of the commodity be sufficient to swing the pendulum and attached index to a point beyond the capacity of the chart 25 a counterbalancing poise may be placed in the pan 10, thereby depressing the free end of the lever 4 and acting through the ribbon 23 and power sector 21 to swing the index to the left. The weight of the commodity in the pan 11 is then found by adding the weight of the poise in the pan 10 and the weight indicated upon the chart 25.

When used as a predetermined weight scale the index 26 is so secured to the pendulum 18 as to extend vertically when there is no load on the scale. A poise of the desired weight is then placed upon the pan 10 and the article the weight of which is to be checked is placed upon the pan 11. If the weight of the article is exactly right the index will remain in vertical position. If the article be under-weight the index will swing to the left correctly indicating the amount of the deficiency. If the article be over-weight the index will swing to the right correctly indicating the amount of the over-weight.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a scale, in combination, a pair of oppositely-extending levers lying substantially side by side, each of said levers being fulcrumed at one end and provided at its other end with load pivots, force-transmitting means connected to each of said levers intermediate its fulcrum and load pivots whereby a load on one lever may be counterbalanced by an equal load on the other lever, and means connected to and connecting said force-transmitting means to offset an excess of load on one of said levers.

2. In a scale, in combination, a pair of oppositely extending levers lying substantially side by side, each of said levers being fulcrumed at one end and provided at its other end with load pivots, force-transmitting means connected to each of said levers intermediate its fulcrum and load pivots whereby a load on one lever may be counterbalanced by an equal load on the other lever, and means connected to and connecting said force-transmitting means to offset an excess of load on either of said levers.

3. In a scale, in combination, a pair of oppositely-extending levers lying substantially side by side, each of said levers being fulcrumed at one end and provided at its other end with load pivots, force-transmitting means connected to each of said levers intermediate its fulcrum and load pivots whereby a load on one lever may be counterbalanced by an equal load on the other lever, and pendulum means connected to and connecting said force-transmitting means to offset an excess of load on either of said levers.

4. In a scale, in combination, a pair of oppositely-extending levers lying substantially side by side, each of said levers being fulcrumed at one end and provided at its other end with load pivots, force-transmitting means connected to each of said levers intermediate its fulcrum and load pivots whereby a load on one lever may be counterbalanced by an equal load on the other lever, and a normally plumb pendulum connected to and connecting said force-transmitting means to offset an excess of load on either of said levers.

5. In a scale, in combination, a pair of oppositely-extending levers lying side by side, each of said levers being fulcrumed at one end and provided at its other end with load pivots, and a normally plumb pendulum oppositely connected to said levers intermediate the fulcrum and load pivots thereof.

HARRY S. BERGEN.